May 22, 1928.
G. E. MOORE
1,670,733
TURNTABLE TROLLEY AND HOISTING MECHANISM FOR CRANES
Filed May 8, 1924     5 Sheets-Sheet 1
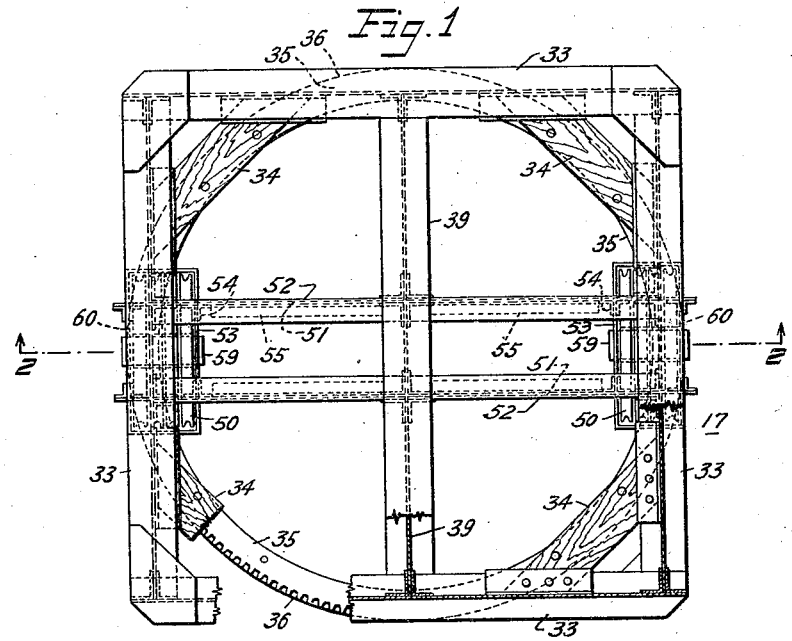
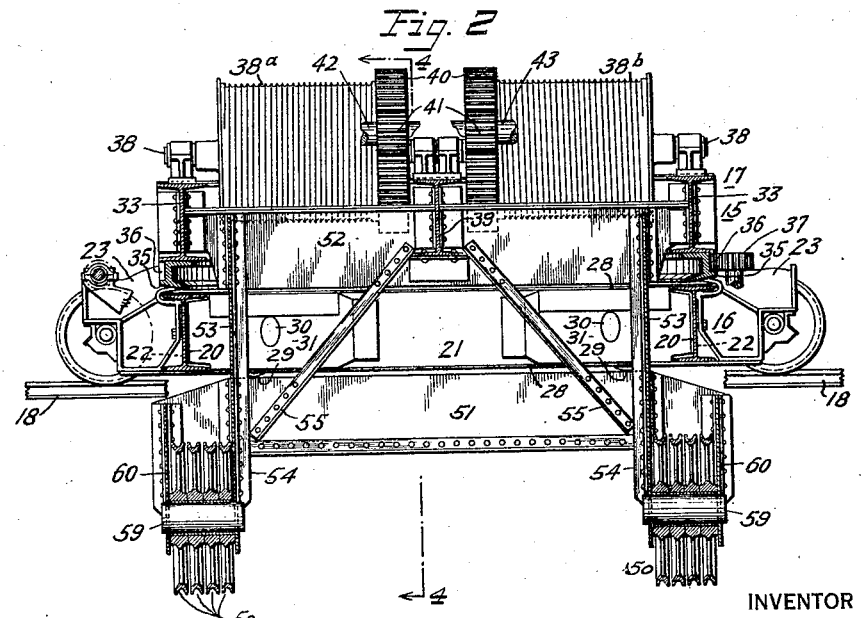
INVENTOR
George E. Moore.
BY
Frank E. Liverance, Jr.
ATTORNEY

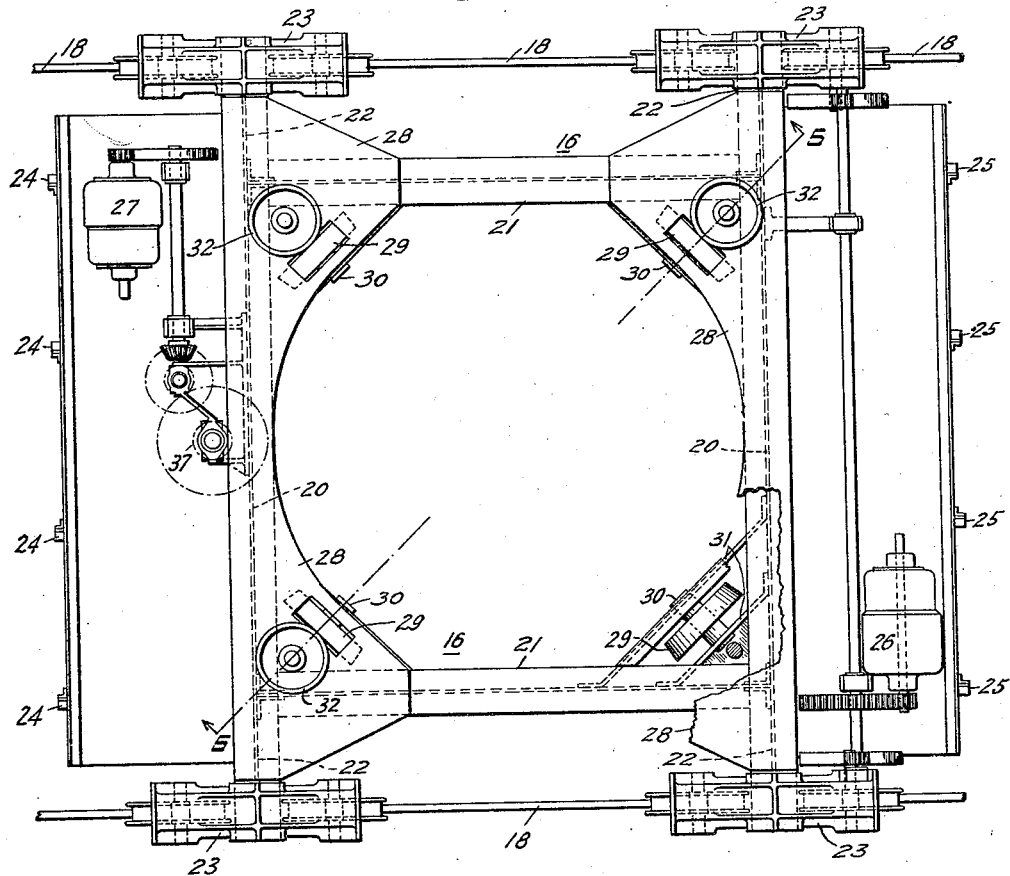

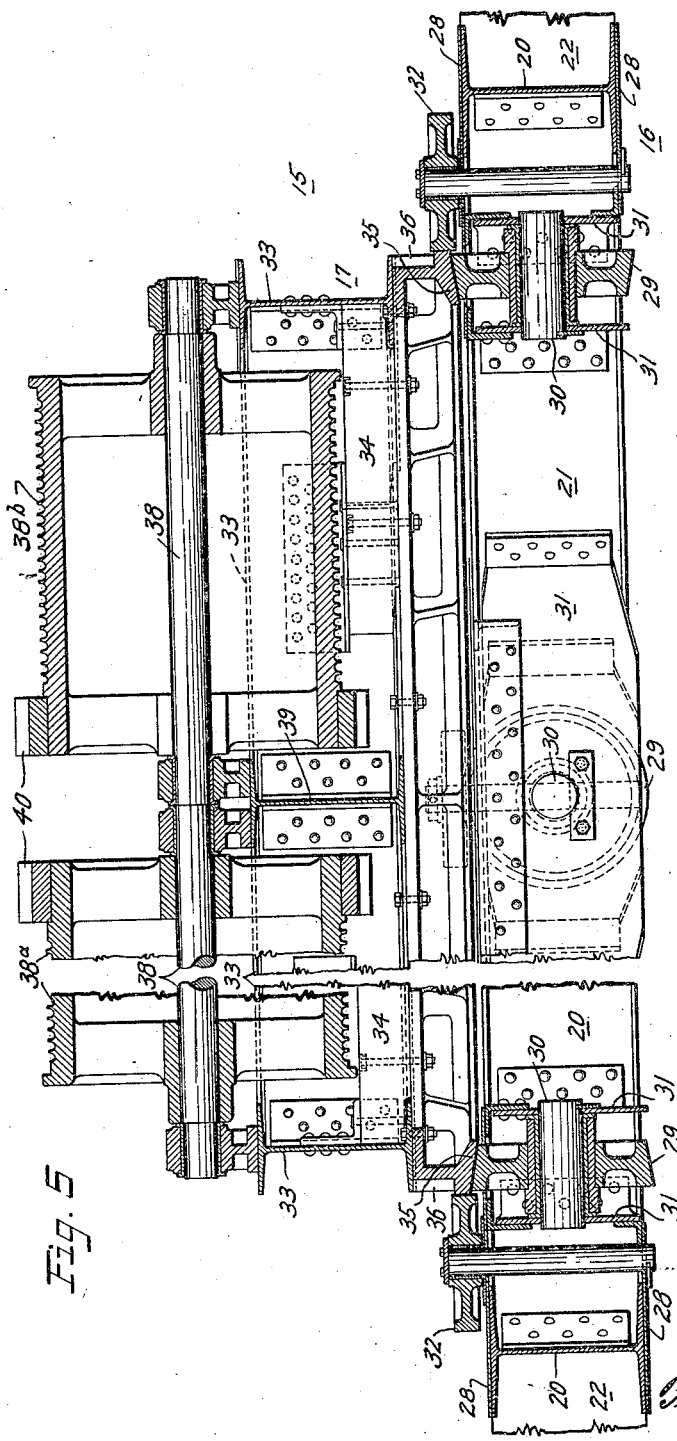

May 22, 1928.  
G. E. MOORE  
1,670,733  
TURNTABLE TROLLEY AND HOISTING MECHANISM FOR CRANES  
Filed May 8, 1924  5 Sheets-Sheet 5
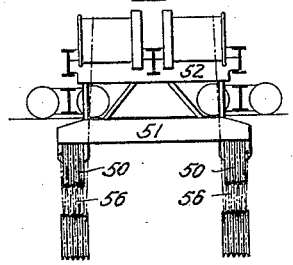
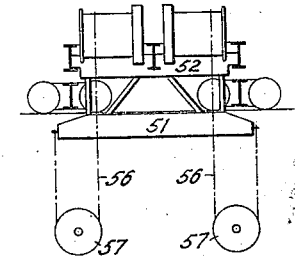
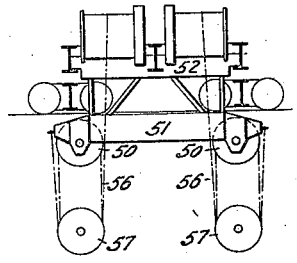
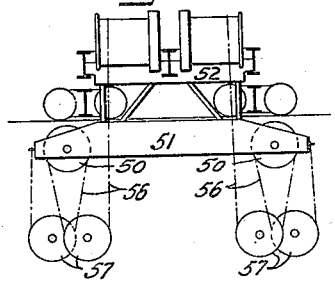
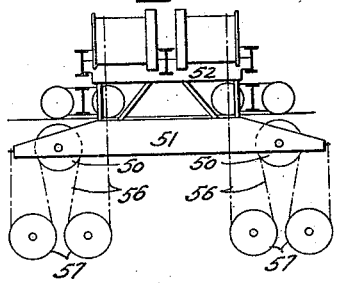
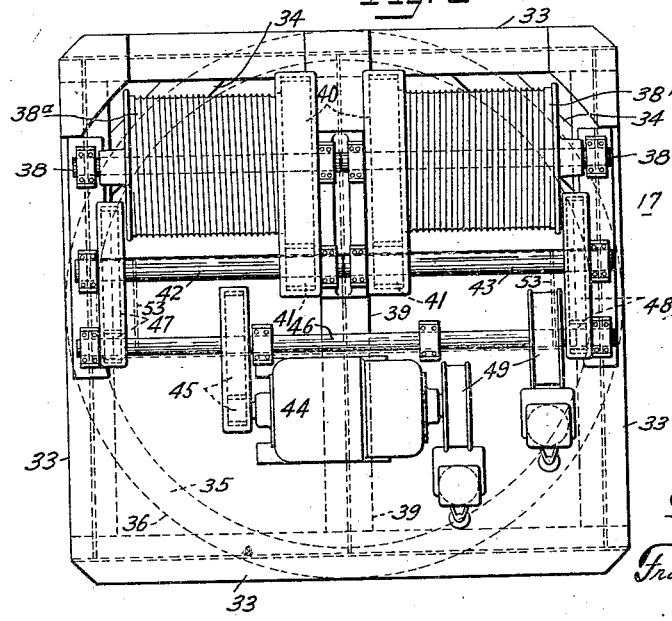
INVENTOR  
George E. Moore.  
BY  
Frank E. Liverance, Jr.  
ATTORNEY Patented May 22, 1928.

1,670,733

UNITED STATES PATENT OFFICE.

GEORGE EDWARD MOORE, OF MUSKEGON, MICHIGAN, ASSIGNOR TO MANNING, MAXWELL & MOORE, INC., OF NEW YORK, N. Y., A CORPORATION OF NEW JERSEY.

TURNTABLE TROLLEY AND HOISTING MECHANISM FOR CRANES.

Application filed May 8, 1924. Serial No. 711,789.

This invention relates to improvements to hoisting mechanism, particularly with respect to a trolley construction and hoisting mechanism associated therewith for use in cranes of the turn-table type.

Cranes of this character, particularly where the same are to carry heavy loads, must be strong and durable; light, as well as strong; the head room occupied by the trolley and the hoisting mechanism mounted thereon must be as small as possible; the structure must be kept within certain definite limits as to over-all dimensions yet maintain proper and effective structural and operative conditions, particularly in cranes of high capacity of the turn-table type; and the roller path diameter for the rotating member of the trolley must have maximum length within the limits prescribed by the over-all dimensions to which the structure is restricted.

It is a primary object and purpose of this invention to produce a trolley construction for cranes of the type outlined by means of which the above named objects are effectively attained in a practical manner. A further object of the invention is to provide an improved construction for cranes of the turn-table type whereby an improved means for increasing the spread of the hoisting blocks is provided, this increasing the capacity of the crane to operate satisfactorily under varying operating conditions, with increased capacity obtained for carrying eccentric loads, and rotating at great speeds and for starting and stopping rotation quickly; this without changing the over-all dimensions of the trolley so that it may be received in a car for shipment under the size limits prescribed by shipping regulations. Other objects and purposes not specifically enumerated above will appear as understanding of the invention is had from the following detailed descriptions of preferred structures embodying the invention taken in connection with the accompanying drawings illustrating the same and in which, Fig. 1 is a plan of the upper trolley, the winding mechanism mounted thereon being removed and parts broken away for better showing the construction.

Fig. 2 is a vertical section taken substantially on the line 2—2 of Fig. 1 and looking in the direction of the arrows, the winding mechanism being shown in place and the upper and lower frame sections assembled together.

Fig. 3 is a plan of the lower trolley frame section.

Fig. 5 is an enlarged fragmentary vertical section taken substantially on the diagonal line 5—5 of Fig. 3, looking in the direction of the arrows.

Fig. 6 is a plan of the upper trolley frame section showing the hoisting mechanism in position, and Figs. 7 to 11 inclusive are diagrammatic views showing different methods of utilizing the flexible hoisting cables.

Like reference characters refer to like parts in different figures of the drawings.

Figure 4:
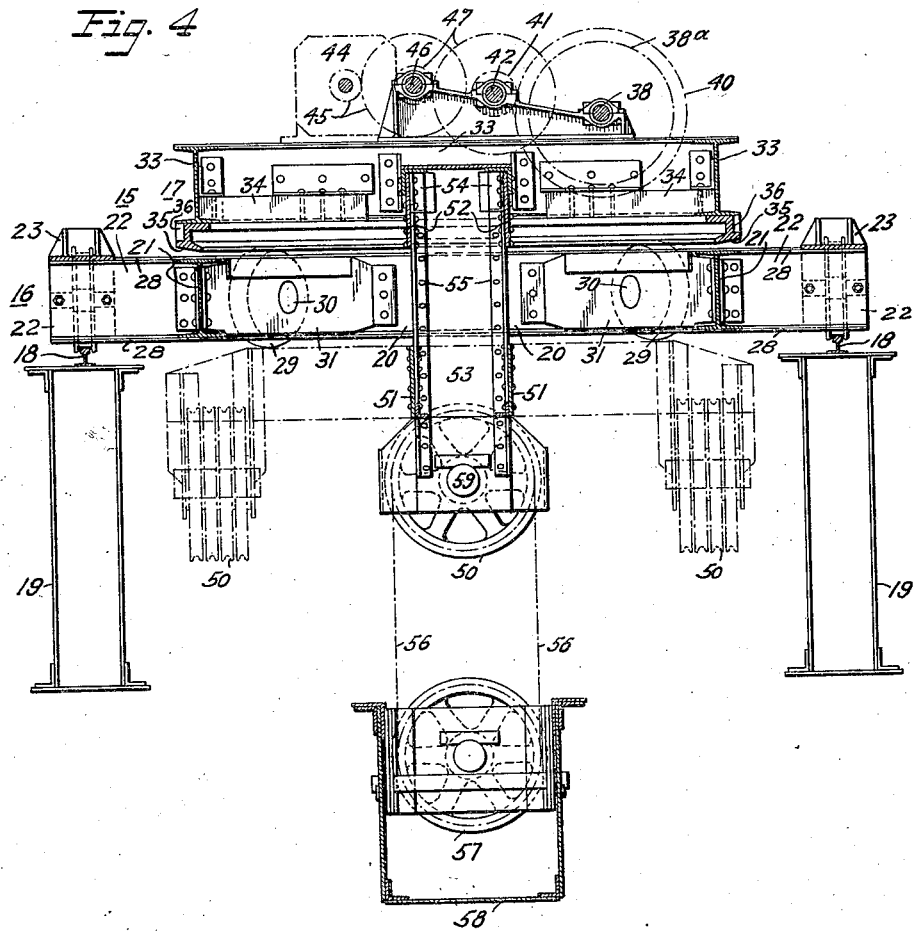
Fig. 4 is a vertical section taken substantially on the line 4—4 of Fig. 2, looking in the direction of the arrows, the upper lifting beam being shown in full and in dot and dash line, the latter after movement of the turn-table a quarter turn.

The trolley indicated as a whole at 15, in its preferred form, is constructed with lower and upper sections 16 and 17, respectively. The lower trolley section 16 in the form of a rectangular frame, is supported for travel on rails 18 carried by bridge girders 19 of the usual crane bridge. This bridge may be and usually is supported for travel and the trolley is mounted on the bridge for travel in a different direction whereby the trolley and hoisting mechanism on the trolley may be carried over a considerable operative range. The lower frame section is made up of transverse sills 20 and longitudinal sills 21, located in planes at right angles to the sills 20, and permanently connected together. The transverse sills are provided with an integral extension 22 beyond the sills 21 on which the truck frames 23 carrying the truck wheels which bear on the supporting rails 18 are mounted. The method of detachable connection of the truck frames to the sill extensions and the constructions used form the subject matter of a separate application for patent. The lower frame section carries detachable platforms supported by brackets, such as 24 and 25, for supporting different driving mechanism of the crane.

The platform supported by brackets 25 carries a motor 26 which, through intermediate gears and connections, transmits power to the truck wheels for propelling the trolley over the bridge, and the platform supported by brackets 24 carries a motor 27 which, through intermediate connections and gears, transmits turning movement to the upper trolley frame or turntable section 17 of the trolley. Reinforcing plates 28, as shown in Fig. 3, are riveted or otherwise permanently secured to the sills 20 and 21 lying over the upper flanges thereof. Rollers 29 are supported on short shafts or spindles 30 mounted in diagonally disposed braces 31 in the corners of the lower frame 16, the ends of the braces being secured to the sill members 20 and 21. The rollers are positioned so as to lie almost entirely below the upper side of the sill members with openings in the plates 28 through which the uppermost portions of the rollers extend. Guide rollers 32 are also supported upon the trolley frame section 16 and are mounted to turn on vertical axes. This trolley frame construction provides for a maximum of roller path while the frame construction does not exceed a certain fixed maximum. This is a very important consideration due to the fact that railroad companies fix certain maximum dimensions for articles shipped and frames exceeding this maximum will not be accepted for transportation, and this feature becomes of special importance in cranes desired to carry very heavy loads wherein, it is evident, the roller path must be of such diameter to provide adequate support for such loads.

The upper trolley frame section 17 is substantially square, the frame being made of longitudinal and transverse sills 33 connected at their ends. These sills, as well as the sills 20 and 21 in the lower section 16, are preferably made of commercial shapes used in iron and steel structural work such as I-beams. Diagonal slabs 34 are secured to the sills 33 between the tops and bottom thereof and extend across the corners as supports for the track 35 which is also connected for support on the lower flanges of the transverse sills 33. Track 35 has an inwardly and downwardly inclined surface to bear on the supporting rollers 29 thus supporting the upper trolley frame section 17 for rotation on the lower section. A rack 36 is formed on the track member 35 around the same and a pinion 37 (see Fig. 2) driven by the motor 27, engages with the rack for effecting a rotation of the upper section.

A hoisting mechanism is carried by the upper rotatable section 17, in this hoisting mechanism a winding unit comprising two drum sections or parts 38ª and 38ᵇ (see Figs. 2 and 5) is used, one of the sections being formed with a right hand groove and the other with a left hand groove for receiving the flexible hoisting cables used. The drum sections are supported on separate shafts 38 mounted in bearings which are carried on the side sills 33 and an intermediate sill 39, said shafts being located in alinement. At the adjacent ends of drum sections 38ª and 38ᵇ, each carries a driving gear 40 permanently connected thereto. Pinions 41 fixed on shafts 42 and 43 mesh with the gears 40. The shafts 42 and 43 are parallel with shafts 38 and are likewise mounted in bearings connected to and supported on the sills 33 and 39 as shown in Fig. 6. The shafts 42 and 43 are driven by a motor 44 through intermediate power devices including a gear set 45 on a shaft 46 and like gear sets 42 and 48 at the ends of the shaft 46, one gear of each of the latter sets being carried by each of the pinion shafts 42 and 43. Magnetic or equivalent brakes 49 (see Fig. 6) may be provided to stop the hoisting mechanism or to hold it in desired position.

By the foregoing arrangement of the hoisting mechanism, advantages are secured particularly important among which is the lessening of head room occupied by the trolley. It will be noted that with this construction, as shown in Figs. 5 and 6, the drum sections 38ª and 38ᵇ can be positioned lower down in the trolley frame 17 due to the fact that there is a greater space available adjacent the inner end of the drum sections where gears 40 are located than at the outer ends adjacent the slabs 34 and the other members of the frame. Moreover since the sections 38ª and 38ᵇ are driven from separate shafts 38, each shaft 38 may be of a smaller diameter than would be required if a single driving shaft was used. The pinions 41 may be correspondingly reduced in size and the gears 40 likewise reduced with maintenance of a desired gear ratio between the parts. In addition a better distribution of power to the hoisting mechanism is accomplished than if the power were applied at one end of a relatively long drum.

The upper lifting blocks or sheaves 50 of the mechanism are carried directly by the upper turn-table section 17. Said blocks are attached to a frame or beam member 51 built structurally into and made rigid with the section 17 but located in a plane below the lower trolley frame 16. The beam 51 is built of separate plates connected together, preferably, and connected to an upper beam member 52, also made of plates and connected to form a box girder, the latter beam member 52 being permanently joined to and extending transversely of the upper trolley frame member 17, and positioned in the same plane with the sills 33 and the cross sill 39 of the frame. The lower and upper beam members 51 and 52 are connected together by transversely disposed plates 53, as shown in Fig. 2, which extend between the side plates of the upper and lower beam members and are connected thereto by vertical angle bars 54. In addition, the structure may be reinforced by angle braces 55 best shown in Fig. 2, which extend between the lower and upper beams 51 and 52 as shown. By this construction a relatively rigid composite or compound girder is made which extends between the upper rotary trolley section 17 to a plane below the level of the lower trolley section 16, to be used for supporting the upper pulley blocks or sheaves 50.

The lower beam 51 lies wholly beneath the lower trolley frame section 16 whereby it may be extended in length to any desired degree, limited only by the distance between the bridge girders 19; and it might even be made longer than this distance if said beam member 51 was positioned below the lower sides of the bridge girders. Due to this arrangement the upper blocks or sheaves 50 may be separated to an extent greater than the diameter of the roller path of the rotary trolley section, or a distance greater than the internal clearance between the frame members of the upper and lower trolley sections. Flexible hoisting ropes or cables 56 connect blocks 50 with lower lifting blocks 57, which are mounted on and carried by a lower lifting beam 58; and the blocks 57 are preferably spaced to correspond with the spacing of the upper blocks 50. This positioning of the blocks 50 and 57 affords a great turning movement for turning the lower lifting beam 58 and the load carried thereby and also increases the stability of the lower lifting beam. Heavy loads having great inertia or, if movement has started, having a great momentum, are handled with increased facility, and the capacity of the trolley frame for rotating at speed or stopping or starting quickly with steadiness is increased while the capacity of the lifting beam for carrying eccentric loads is also increased.

In Fig. 2 one method of connecting blocks 50 to the lower beam member 51 is shown, the individual sheaves thereof being supported on pins 59 carried by the plates 53 and plates 60 spaced therefrom but which are connected to the beam member 51 by angle bars riveted thereto. It will be noted that the ropes or cables 56 coming directly from the drum sections 38ª and 38ᵇ lie within the roller path and also in the clear and unobstructed space between the inner sides of the lower frame section 16; and that the blocks 50 on the beam 51 may be spaced apart a distance greater than the diameter of the roller path. The axis of the drum section may be arranged parallel to the axis of the blocks 50 or perpendicular thereto. In Figs. 2 and 7, the former arrangement is shown while in Figs. 8 to 11 inclusive the latter is shown.

The diagrammatic disclosures of Figs. 7 to 11 inclusive show some of the possible arrangements of the hoisting cables and the hoisting mechanism in conjunction with the hoisting blocks along the lines heretofore set forth. Fig. 7 shows the cables issuing directly from the drum sections and downwardly between the inner sides of the trolley frame sections and inside the roller path thereof while the blocks 50 and 57 are spaced farther apart than the diameter of the roller path. Fig. 8 shows a like arrangement for a crane carrying a lighter load and in which the upper blocks may be eliminated and the lower blocks 57 include but one sheave each. In the arrangement shown in Fig. 9 there is similarity to that shown in Fig. 8 but with upper and lower blocks. In the arrangement shown in Figs. 10 and 11 the lower blocks 57 and the lifting beam are somewhat separated, the separation being greater in Fig. 11 than in Fig. 10. All of these views show one more sheave in the lower block than in the upper in which case the ends of the hoisting cables are attached to the beam member 51, where blocks having an equal number of sheaves above or below are used the ropes or cables are attached to the lower blocks.

From the foregoing it will be apparent that a practical and relatively simple construction of hoisting mechanism and turntable trolley for cranes has been produced by means of which the various problems set forth in the general statement of the invention are fully overcome with the production of a strong, durable and practical crane which is capable of withstanding the very severe strains to which it is subjected in service. The diameter of the lower path is at a maximum within the over-all limits permitted. The blocks which carry the load are spread to points to separate them a greater distance than the diameter of the roller path of the trolley. These features combine to make the invention one of great practical importance.

The invention is defined in the appended claims and comprehends all forms of construction coming within their scope. The structure disclosed and described is not to be taken in any sense as limiting the invention thereto but rather as illustrative of the invention which is defined in the following claims.

I claim:

1. In a turntable crane, a trolley having upper and lower frames, the upper frame being mounted for rotation on the lower frame, a beam member disposed below the plane of said lower frame, and connected to the upper frame, hoisting mechanism mounted upon said upper frame and having spaced flexible hoisting members depending therefrom, said trolley being provided with a clear space for the passage of said flexible members and to permit a complete revolution of the upper frame on the lower frame, said flexible members being supported by said beam members and parts thereof having a spread greater than the diameter of said clear space.

2. In a turntable crane, a trolley having upper and lower frames, the upper frame being mounted for rotation on said lower frame, a beam member disposed below the plane of said lower frame and connected to the upper frame, hoisting mechanism mounted upon said upper frame and having spaced flexible hoisting members depending therefrom, said trolley being provided with a clear space for the passage of said flexible members and to permit a complete revolution of the upper frame, and spaced hoisting blocks carried by said beam member through which said flexible members are threaded, said blocks having a spread greater than the diameter of said clear space.

3. In a turntable crane, a trolley having upper and lower frames, a circular track for mounting the upper frame for rotation on the lower frame, a beam member rotatable with the upper frame and lying below the plane of the lower frame, winding mechanism mounted upon the trolley, spaced hoisting blocks mounted upon the beam member and having a spread greater than the diameter of the path of the track and flexible hoisting members issuing from the winding mechanism and passing within the vertical limits of said track and over said hoisting blocks.

4. In a turntable crane, a trolley having upper and lower frames, the upper frame being mounted for rotation on the lower frame and having a beam member lying below the plane of the lower frame, a divided winding drum mounted upon the trolley, each division thereof having a separate driving gear, spaced hoisting blocks mounted upon the beam member and having a spread greater than the internal diameter of the lower trolley frame, and flexible hoisting members issuing from the different divisions of the hoisting drum and passing within the vertical limits of the lower trolley frame and over the hoisting blocks.

5. In a turntable crane, a trolley having upper and lower frames, the upper frame being mounted for rotation on the lower frame and having a beam member lying below the plane of the lower frame, a divided winding drum mounted upon the trolley, each division thereof having a separate driving gear, spaced upper hoisting blocks mounted upon the beam member and having a spread greater than the internal diameter of the lower trolley frame, a lifting beam having spaced lower blocks thereon, flexible hoisting members issuing from the different divisions of the hoisting drum and passing within the vertical limits of the lower trolley frame and over the upper and lower hoisting blocks, and flexible hoisting members supported upon the upper and lower blocks.

6. In a turntable crane, a trolley having a divided frame, a circular track for rotatably supporting one part of the divided trolley frame by the other part, hoisting mechanism including a hoisting drum carried by the rotatable turntable part and rotatable therewith, and a multi-strand hoisting tackle including hoisting blocks carried by the rotary turntable part and spaced apart a greater distance than the inner diameter of the track, the strand issuing directly from the drum passing within the track and others passing over said blocks and being disposed without the vertical limits of the track.

7. In a turntable crane, a trolley having a divided frame, a circular track for rotatably supporting one part of the divided trolley frame by the other part, hoisting mechanism including a hoisting drum carried by the rotatable turntable part and rotatable therewith, and a multi-strand hoisting tackle including hoisting blocks carried by the rotary turntable part, the blocks being disposed below the horizontal plane of the other trolley part and spaced apart a greater distance than the inner diameter of the track, the strand of said tackle issuing directly from said drum passing within the track and other strands passing over the blocks.

8. In a turntable crane, a trolley having a divided frame, a circular track for rotatably supporting one part of the divided trolley frame by the other part, hoisting mechanism including a two part hoisting drum carried by the rotary turntable part and rotatable therewith, one part of the drum having a right hand groove and the other a left hand groove, a separate driving gear for each of the drum parts, and a multi-strand hoisting tackle including hoisting blocks carried by the rotary turntable part and spaced apart a greater distance than the inner diameter of the track, the strands of the tackle issuing directly from the drum passing within the track and other strands passing over the blocks.

9. In a turntable crane, a trolley having a divided frame, a circular track for rotatably supporting one part of the divided trolley frame by the other part, hoisting mechanism including a two part hoisting drum carried by the rotary turntable part and rotatable therewith, one part of the drum having a right hand groove and the other a left hand groove, a separate driving gear for each of the drum parts, and a multi-strand hoisting tackle including hoisting blocks carried by the rotary turntable part and spaced apart a greater distance than the inner diameter of the track, the strands of the tackle issuing directly form the drum passing within said track and other strands passing over the blocks, the blocks being disposed below the horizontal plane of the other trolley part.

10. In a turntable crane, a trolley having a divided frame with one part thereof rotatably mounted with reference to the other part, hoisting mechanism carried by the rotary turntable part and rotatable therewith, said hoisting mechanism including a two part winding drum, and a separate driving gear for each part of the drum, said rotatably mounted frame part including connected sides making a rectangular frame part and reinforcing slabs located diagonally at the corners of said rotatable frame part and permanently sewed at their ends to adjacent sides of said frame part.

11. In a turntable crane, a trolley having a divided frame with one part thereof rotatably mounted with reference to the other part and comprising a rectangular frame part and a center beam paralleling two of the sides of said frame part, hoisting mechanism carried by the rotary turntable part and rotatable therewith, said hoisting mechanism including a two part winding drum, one part having a left hand groove and the other a right hand groove, a shaft on which the two parts of the drum are mounted, supporting beamings for the shafts carried on the center beam and the sides of the frame part paralleling the center beam, and a separate driving gear for each part of the drum, spaced hoisting blocks carried by the rotary turntable part, and flexible hoisting members issuing respectively from the right and left hand grooves and threaded through the spaced hoisting blocks.

12. In a turntable crane, a trolley having a divided frame with one part thereof rotatably mounted with reference to the other part, and comprising a rectangular frame part and a center beam paralleling two of the sides of said frame part, hoisting mechanism carried by the rotary turntable part and rotatable therewith, the hoisting mechanism including a two part winding drum, shafts on which the two parts of the drum are mounted, supporting beamings for the shafts carried on the center beam and the sides of the frame part paralleling the center beam, and a separate driving gear for each part of the drum, the driving gears being disposed at inner adjacent ends of the drum parts, and driving pinions meshing with the driving gears.

In testimony whereof I affix my signature.

GEORGE EDWARD MOORE.